United States Patent [19]

Sommerfeld

[11] Patent Number: 5,676,500
[45] Date of Patent: Oct. 14, 1997

[54] RELEASABLE FIXTURE CLAMP

[76] Inventor: Craig A. Sommerfeld, Rte. 1, Kelley, Iowa 50134

[21] Appl. No.: 578,216

[22] Filed: Dec. 26, 1995

[51] Int. Cl.[6] .................................................. B23B 49/00
[52] U.S. Cl. ........................................ 408/103; 408/115 R
[58] Field of Search .................... 408/97, 103, 115 R, 408/241 B

[56] References Cited

U.S. PATENT DOCUMENTS

| | | | |
|---|---|---|---|
| 1,128,970 | 2/1915 | Godefroy et al. | 408/97 |
| 2,181,746 | 11/1939 | Siebrandt . | |
| 2,602,238 | 7/1952 | Wellman . | |
| 2,674,907 | 4/1954 | Zoll | 408/97 |
| 3,069,933 | 12/1962 | McCall | 408/115 R |
| 3,386,318 | 6/1968 | Pekarcik et al. . | |
| 3,465,620 | 9/1969 | Hilburn | 408/115 R |
| 3,626,513 | 12/1971 | Pytlak . | |
| 4,027,992 | 6/1977 | Mackey, Sr. et al | 408/97 |
| 4,601,618 | 7/1986 | McEldowney . | |
| 4,730,959 | 3/1988 | Aerni et al. . | |
| 4,747,588 | 5/1988 | Dillhoff . | |
| 4,955,766 | 9/1990 | Sommerfeld . | |
| 5,163,792 | 11/1992 | Slavik . | |
| 5,322,396 | 6/1994 | Blacker . | |

*Primary Examiner*—Daniel W. Howell
*Attorney, Agent, or Firm*—Henderson & Sturm

[57] ABSTRACT

A fixture including a clamp having a pair of opposing clamp members, one clamp member being releasably secured to a guide. In the preferred embodiment, one of the clamp members includes a circular disc that matingly engages a pocket formed in the guide. The clamp is releasably secured to the guide by a movable retainer that extends to engage and retain the circular disc when it is received in the pocket. When the retainer is moved out of engagement with the circular disc, the clamp may be removed from the pocket and used in other applications requiring a clamp.

20 Claims, 3 Drawing Sheets

RELEASABLE FIXTURE CLAMP

TECHNICAL FIELD

This invention relates to fixtures such as those used in woodworking, and more particularly, to a fixture including a clamping member secured to a tool guide.

BACKGROUND ART

Various fixtures are available that include an adjustable clamp and a permanently attached tool guide. One such fixture is the clamping pocket hole drill guide described in U.S. Pat. No. 5,322,396. One disadvantage of this fixture is that the clamp cannot be removed from the tool guide and used for other purposes.

Those concerned with these and other problems recognize the need for an improved fixture having a guide releasably secured to a clamp member.

DISCLOSURE OF THE INVENTION

The present invention provides a fixture including a clamp having a pair of opposing clamp members, one clamp member being releasably secured to a guide. In the preferred embodiment, one of the clamp members includes a circular disc that matingly engages a pocket formed in the guide. The clamp is releasably secured to the guide by a movable retainer that extends to engage and retain the circular disc when it is received in the pocket. When the retainer is moved out of engagement with the circular disc, the clamp may be removed from the pocket and used in other applications requiring a clamp.

An object of the present invention is the provision of an improved fixture having a releasable clamp in combination with a guide.

Another object is to provide a clamping fixture that has multiple uses.

A further object of the invention is the provision of a clamping fixture that is convenient to use.

Still another object is to provide a clamping fixture for a pocket hole drill guide.

A still further object of the present invention is the provision of a clamping fixture that is durable and easy to maintain.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
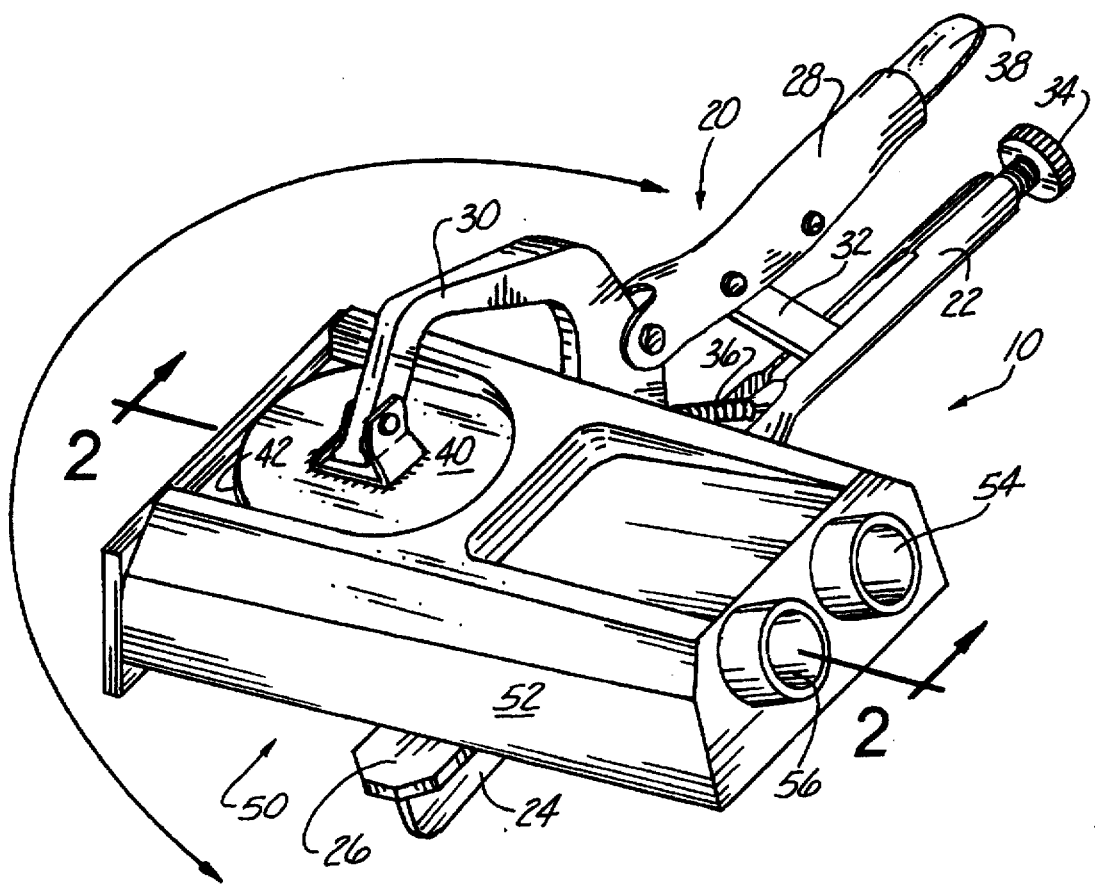
FIG. 1 is a perspective view of the clamping fixture of the present invention.

Referring now to the drawings, wherein like reference numerals designate identical of corresponding parts throughout the several views, FIG. 1 shows the fixture (10) of the present invention including a clamp (20) and a releasably attached pocket hole drill guide (50). The clamp (20) includes a lower handle (22) having a forwardly extending lower C-shaped clamping arm (24) and a pivotally attached workpiece engaging pad (26). An upper handle (28) is pivotally attached to an upper C-shaped clamping arm (30) which pivotally carries a larger circular disc (40) having a peripheral edge (42). The upper clamping arm (30) is also pivotally attached to the lower handle (22). A clamp bite adjusting follower (32) is pivotally attached to the upper handle (28) and slidably engages the lower handle (22) forward of the bite adjusting screw (34). A spring (36) interconnects the lower handle (22) and the upper clamping arm (30) to bias the end of the follower (32) toward contact with the end of adjusting screw (34). A spring biased release lever (38) is pivotally attached to the upper handle (28) and is disposed to engage the follower (32).

Figure 2:
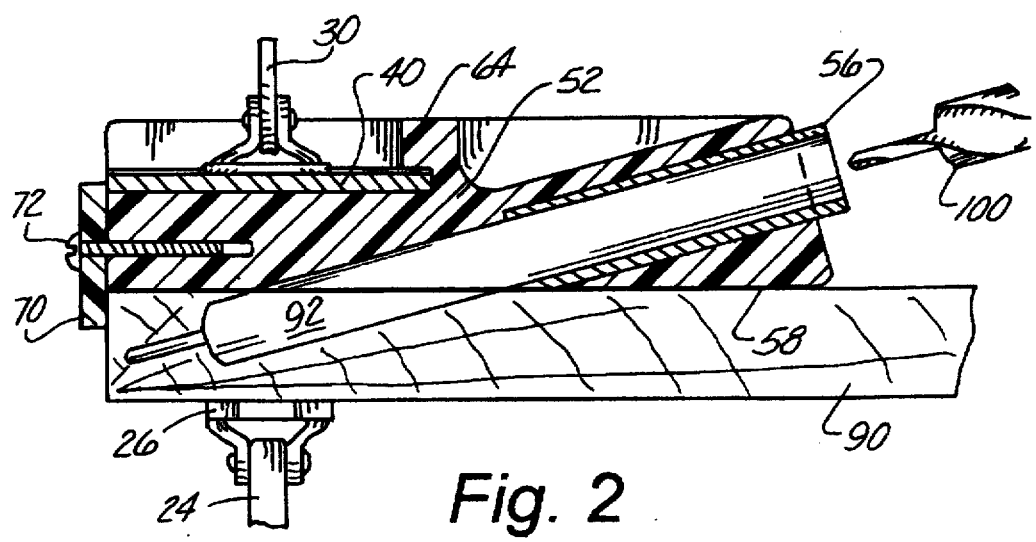
FIG. 2 is a sectional view taken along line 2—2 of FIG. 1, illustrating a wooden workpiece secured in the fixture so that a pocket joint may be drilled in the workpiece by a drill bit.
Figure 3:
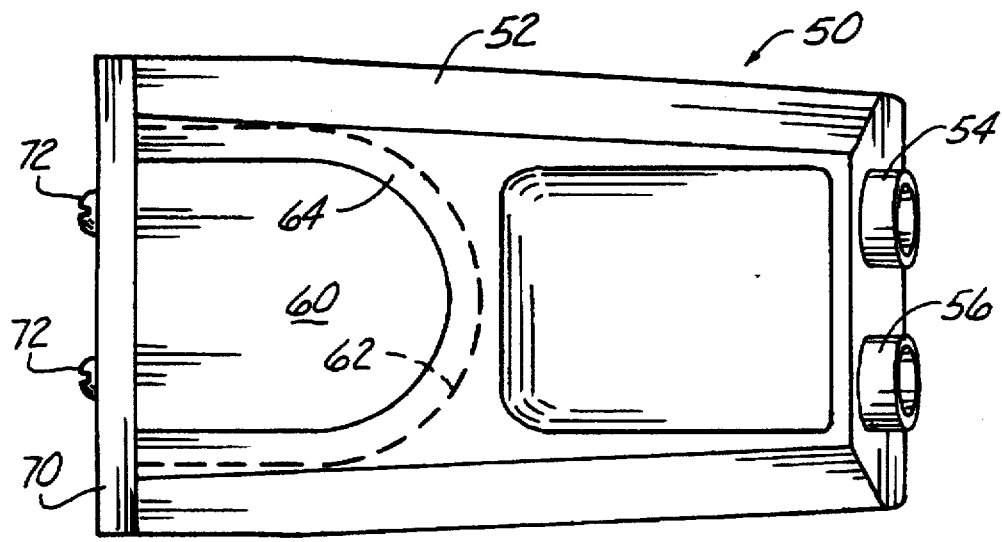
FIG. 3 is a top plan view of the drill guide shown apart from the releasable clamp.
Figure 4:
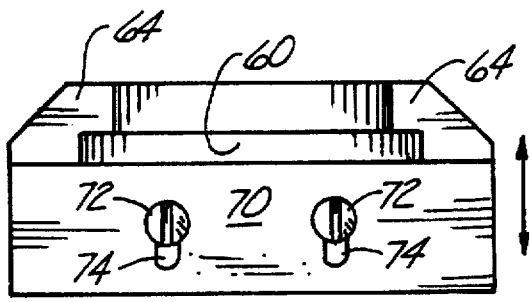
FIG. 4 is an end elevational view of the drill guide.

The pocket hole drill guide (50) includes a body portion (52) that supports a pair of parallel disposed case hardened drill bit receiving sleeves (54 and 56) that are directed at an angle of about fifteen degrees with respect to a planar workpiece engaging surface (58). As best seen by reference to FIGS. 2–5, an inverted U-shaped pocket (60) is formed in the lower end of the guide (50) and includes an upper arcuate section (62) that forms a closed end of the pocket (60). An overhanging lip (64) extends inwardly from the sides and closed end of the pocket (60). A slidable gate (70) is attached by screws (72) to the lower end of the guide (50) below the pocket (60). Engagement of the screws (72) in slots (74) allows for slidable movement of the gate (70) between a retracted position (FIGS. 4 and 5) and an extended position (FIGS. 1 and 2). A first portion of the gate (70) covers the open end of the pocket (60) when the gate (70) is in the extended position, and a second portion of the gate (70) extends out perpendicular to the planar surface (58) of the guide (50).

Figure 6:
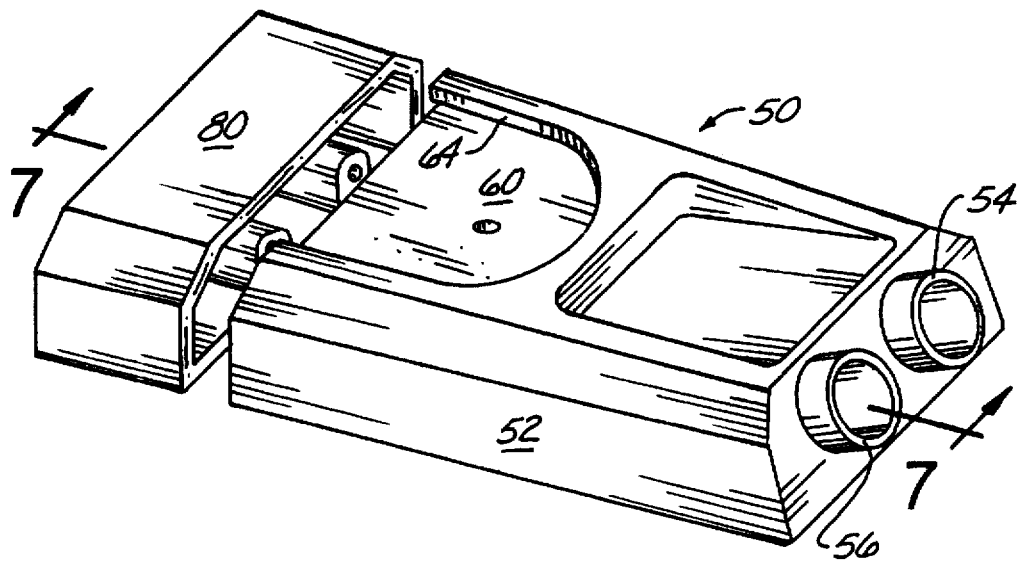
FIG. 6 is a perspective view of the drill guide and an attachable guide extension.
Figure 7:
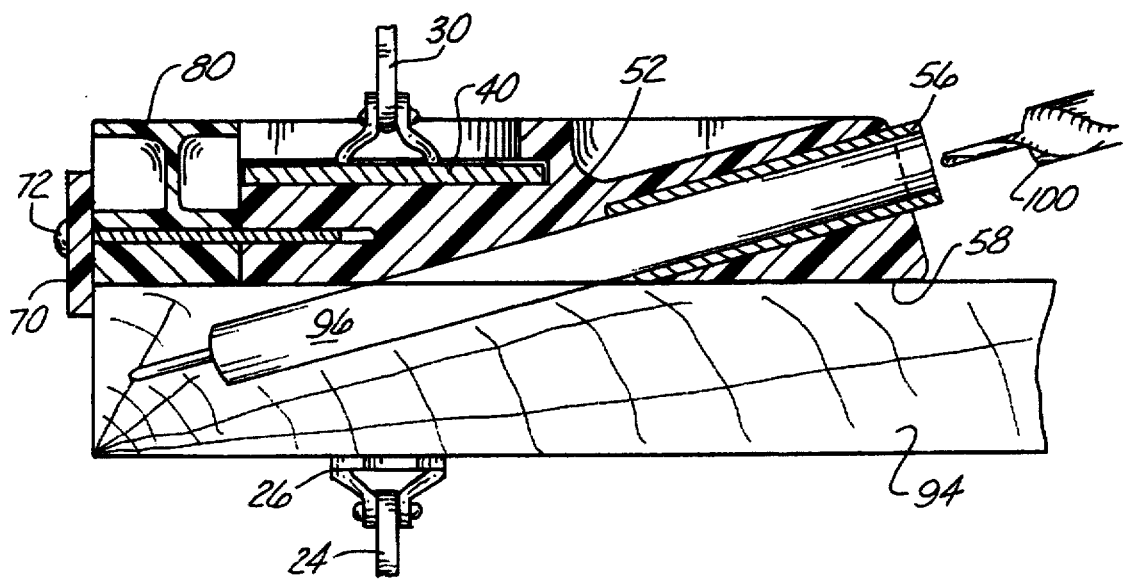
FIG. 7 is a sectional view taken along line 7—7 of FIG. 6, illustrating a thicker wooden workpiece positioned for drilling a pocket joint.

An alternate embodiment of the present invention is shown in FIGS. 6 and 7 where a guide extension (80) is shown attached to the lower end of the guide (50) between the pocket (60) and the gate (70).

Figure 5:
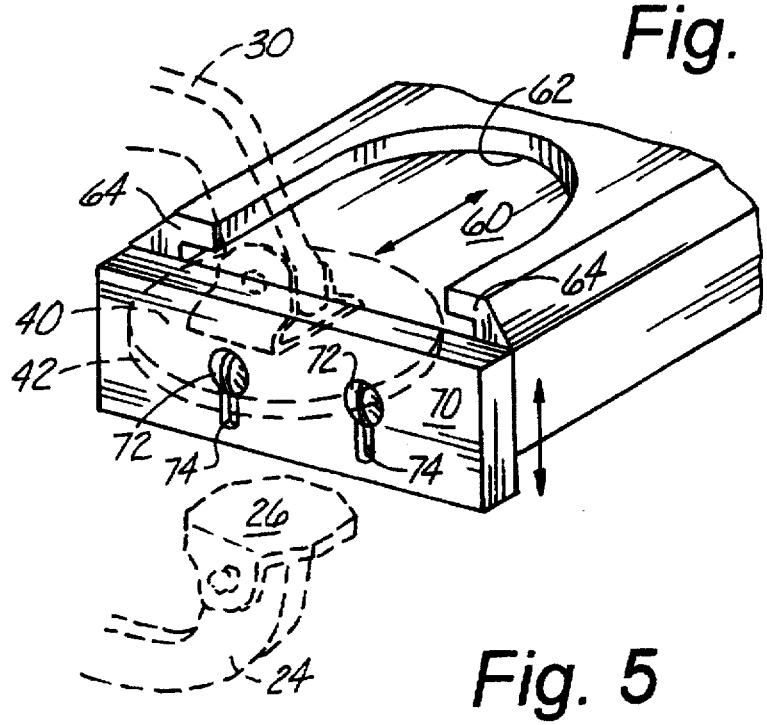
FIG. 5 is a partial perspective view illustrating how the clamp, shown in dashed lines, is inserted in a pocket formed in one end of the guide.

In the embodiment of FIGS. 1–5, the clamp (20) is releasably attached to the guide (50) as best illustrated in FIG. 5. When the gate (70) is in the retracted position, the disc (40) is inserted into the pocket (60) until the peripheral edge (42) of the disc (40) engages the arcuate section (62) of the pocket (60). The gate (70) is then moved to the extended position (FIGS. 1 and 2) where the first portion of the gate (70) engages the peripheral edge (42) of the disc (40). The clamp (20) is, thus, pivotally secured to the guide (50) and is positionable thereto as indicated by the directional arrow in FIG. 1.

As illustrated in FIG. 2, a workpiece (90) is positioned between the planar surface (58) of the guide (50) and the clamp pad (26), and one end of the workpiece (90) is positioned to engage the second portion of the gate (70) that extends out perpendicular to the planar surface (58). The guide (50) is, thus, positioned at one end of the workpiece (90), and the handles (22 and 28) of the clamp (20) are brought together to secure the workpiece (90) in the desired position with respect to the guide (50). Screw pockets (92) are then drilled in the workpiece (90) at the proper angle and depth by the drill bit (100) received in and guided by the sleeves (54 and 56) of the guide (50). The clamp (20) is then released by operation of the release lever (38) and the workpiece (100) is removed and another workpiece is positioned in the fixture (10).

When it is desirable to use the clamp (20) in other applications apart from the guide (50), the gate (70) is simply moved to the retracted position (FIGS. 4 and 5), and the circular disc (40) is moved out of the open end of the pocket (60).

In the embodiment of FIGS. 6-7, the clamp (20) is releasably attached to the guide (50) by inserting the disc (40) into the pocket (60) and then attaching the guide extension (80). The guide extension (80) covers the open end of the pocket (60) and secures the clamp (20) to the guide (50). As illustrated in FIG. 7, the guide extension (80) is suitable for use with a thicker workpiece (92) where it provides for the formation of a longer screw pocket (96) that is substantially centered with respect to the thickness of the workpiece (94). Removal of the guide extension (80) allows removal of the clamp (20) for other uses.

Thus, it can be seen that at least all of the stated objective have been achieved.

Obviously, many modifications and variations of the present invention are possible in light of the above teachings. It is therefore to be understood that, within the scope of the appended claims, the invention may be practiced otherwise than as specifically described.

I claim:

1. A fixture, comprising:
    a clamp, including a pair of opposing clamp members; and
    a guide, including means for releasably securing one of the clamp members to the guide, wherein the releasable securing means includes a pocket formed on the guide for receiving the one clamp member.

2. The fixture of claim 1, wherein the releasable securing means includes a selectively movable retainer disposed to engage the one clamp member when it is positioned in the pocket.

3. The fixture of claim 1, wherein the one clamp member includes a clamp face formed of a circular disc having a peripheral edge disposed to be received in the pocket, thereby pivotally securing the guide to the clamp.

4. The fixture of claim 3, wherein the pocket includes a section having an arcuate surface disposed to matingly receive a portion of the peripheral edge of the circular disc.

5. The fixture of claim 3, wherein the releasable securing means includes a selectively movable retainer disposed to engage the one clamp member when it is positioned in the pocket.

6. The fixture of claim 4, wherein the releasable securing means includes a selectively movable retainer disposed to engage the one clamp member when it is positioned in the pocket.

7. The fixture of claim 2, wherein the pocket includes a closed end and an open end, and wherein the movable retainer includes a slidable gate disposed to move between a retracted position spaced from the open end of the pocket, and an extended position coveting the open end of the pocket.

8. The fixture of claim 3, wherein the pocket includes a closed end and an open end, and wherein the movable retainer includes a slidable gate disposed to move between a retracted position spaced from the open end of the pocket, and an extended position coveting the open end of the pocket.

9. The fixture of claim 4, wherein the pocket includes a closed end and an open end, and wherein the movable retainer includes a slidable gate disposed to move between a retracted position spaced from the open end of the pocket, and an extended position covering the open end of the pocket.

10. The fixture of claim 1, wherein the releasable securing means includes a guide extension attached to the guide adjacent the pocket and disposed to engage the one clamp member when it is positioned in the pocket.

11. The fixture of claim 10, wherein the clamp member includes a clamp face formed of a circular disc having a peripheral edge disposed to be received in the pocket, thereby pivotally securing the guide to the clamp.

12. The fixture of claim 11, wherein the pocket includes a section having an arcuate surface disposed to matingly receive a portion of the peripheral edge of the circular disc.

13. A fixture, comprising:
    a clamp, including a pair of opposing clamp members;
    a pocket joint drill guide; and
    means for releasably securing one of the clamp members to the drill guide, wherein the releasable securing means includes a pocket formed on the guide for receiving the one clamp member.

14. The fixture of claim 13 further including means for positioning the drill guide at an end of a workpiece.

15. The fixture of claim 14, wherein the releasable securing means and the drill guide positioning means include a selectively movable retainer attached to the drill guide, the retainer including a first portion disposed to engage the clamp member when it is positioned in the pocket and a second portion disposed to engage the end of the workpiece.

16. The fixture of claim 13, wherein the releasable securing means includes a selectively movable retainer disposed to engage the one clamp member when it is positioned in the pocket.

17. The fixture of claim 13, wherein the one clamp member includes a clamp face formed of a circular disc having a peripheral edge disposed to be received in the pocket, thereby pivotally securing the guide to the clamp.

18. The fixture of claim 17, wherein the pocket includes a section having an arcuate surface disposed to matingly receive a portion of the peripheral edge of the circular disc.

19. The fixture of claim 17, wherein the releasable securing means includes a selectively movable retainer disposed to engage the one clamp member when it is positioned in the pocket.

20. The fixture of claim 18, wherein the releasable securing means includes a selectively movable retainer disposed to engage the one clamp member when it is positioned in the pocket.

* * * * *